Aug. 15, 1967 R. J. SMITH 3,336,034
FORCE ADAPTIVE DYNAMIC FACE SEAL
Filed Oct. 27, 1964 3 Sheets-Sheet 1

INVENTOR
ROBERT J. SMITH

BY Harry A. Herbert Jr
and Charles H. Wagner
ATTORNEYS

Aug. 15, 1967    R. J. SMITH    3,336,034
FORCE ADAPTIVE DYNAMIC FACE SEAL
Filed Oct. 27, 1964    3 Sheets-Sheet 3

INVENTOR
ROBERT J. SMITH

BY
Harry A. Herbert Jr.
and Charles K. Wagner
ATTORNEYS

United States Patent Office 3,336,034
Patented Aug. 15, 1967

3,336,034
FORCE ADAPTIVE DYNAMIC FACE SEAL
Robert J. Smith, Dayton, Ohio, assignor to the United States of America as represented by the Secretary of the Air Force
Filed Oct. 27, 1964, Ser. No. 406,945
7 Claims. (Cl. 277—88)

The invention described herein may be manufactured and used by or for the United States Government for governmental purposes without payment to me of any royalty thereon.

This invention relates to liquid seals for rotary elements and more particularly to the provision of novel sealing means for a rotary shaft which prevents leakage of liquid or gaseous fluid into or out of a housing through which the shaft passes, and more particularly to "face" seals with compensating means for regulating the friction pressure of the face seal in predetermined ratio to friction and temperature rise between a stationary face seal and a rotary contact face in frictional engagement with the seal, having for an object to control the frictional pressure in predetermined ratio to temperature change in the face seal due to friction between the seal and the rotary contacting member.

A further object of the invention is the provision of a face seal between a stationary and rotary member to prevent fluid leakage therebetween, including temperature responsive means in contact with the face seal for reducing frictional pressure between the seal and rotary member in predetermined ratio to temperature rise between the seal and rotary member due to friction therebetween.

A further object is the provision of a friction face seal between a rotary member and a stationary housing in which means are provided for regulating the frictional contact of the face seal between the rotary member and the stationary housing in predetermined ratio to the frictional contact therebetween.

A further object is the provision of a rotary face contact friction seal between a rotary shaft and a stationary fluid housing through which the shaft passes, which includes an annular frictional contact seal and means responsive to frictional contact of the seal with the rotary member for reducing frictional sealing contact between the seal and the rotary member in predetermined ratio to the frictional contact between the seal face and the rotary member, whereby an increase in friction between the rotary member and the housing during the rotation of the rotary member reduces the degree of frictional sealing contact between the rotary member and housing.

A further object of the invention is the provision of a friction face seal between a stationary housing and a rotary shaft which comprises a torque tube surrounding the shaft responsive to friction between the seal and the shaft for adjusting the degree of friction between the shaft and seal in predetermined ratio to torque applied to the torque tube by said friction, during rotation of said shaft.

A further object is the provision of differential fluid pressure means between a housing and a frictional contact face seal disposed for frictional fluid sealing contact with a rotating shaft in which said differential fluid pressure means is temperature responsive to rise in temperature thereof due to friction between the face seal and the shaft, for reducing the frictional sealing contact relation in predetermined ratio to the temperature rise.

Other objects and advantages of the invention will become apparent from the following description and accompanying drawings in which like reference characters refer to like parts in the several figures.

*Drawings*

Figure 1:
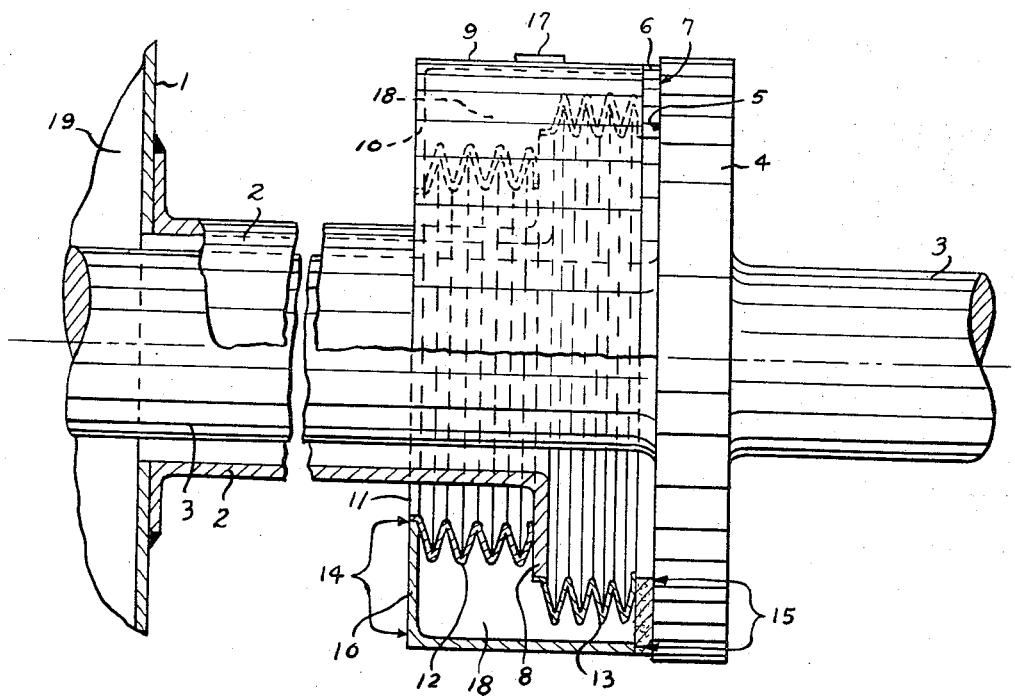
FIG. 1 is a vertical, longitudinal section view, parts being shown in elevation, of a portion of a fluid container or reservoir having a rotary shaft extending therefrom, employing a face seal and incorporating the invention.

There are two types of operation of rotary face seals to prevent fluid leakage between a container and a shaft extending out of the container. These are operations where the seals are in contact, and operations where the seal faces are supported by a hydrodynamic pressure. It has been experimentally verified that the true area of contact between surfaces of two solids can be calculated by dividing the yield point of the weaker material by the contact force. In applying this theory to seal analysis at higher and higher rotative speeds, a point is soon reached where the frictional thermal rise at the contact points dooms the seal to failure. This limits dry operation to relatively low speeds.

Experimental results have also shown that materials with low modulus of elasticity, low coefficient of friction, high thermal conductivity, and high specific heat are the best materials for operation of dry seals, which confirms the theory.

In hydrodynamic operation the face seal is supported over a large area by pressure generated by the waviness of the seal. This force is the same force used on a hydrodynamic thrust bearing, and as long as the seal faces do not contact operation can continue. There are two limits on hydrodynamic operation. The boundary layer between the seal faces must be thick enough to prevent either contact of the seal faces or excessive hydrodynamic friction. If the layer is too thick excessive leakage will occur along the boundary. If a pressure balance of the seal can be preserved, the only hydrodynamic force must be developed by the fluid is that which is necessary to keep the seal faces from contacting under accelerations necessary to follow the inaccuracies of the seal plate or faces. Analysis has shown that accelerations for a two inch diameter seal at 20,000 r.p.m. to be from 1.0 to 0.1 G, depending on whether standard machine shop practice, or high precision seal practice is employed in fininshing the seal contacting surfaces. If the seal is designed with reasonable effort at weight control, the forces necessary are from ½ pound to 1/200 pound force.

Balance seals of this size are normally loaded from 6 to 50 pound force used in practice, and the ½ to 1/200 pound force required for operation can be understood by looking at the pressure induced forces on the seal. During normal operation there is a pressure distribution line across the face of the seal. The pressure starts at the internal pressure on the inside and goes to the external pressure at the outer edge of the seal. This pressure distribution across the face of the seal causes a force tending to separate the seal faces. If wear of the seal causes a shift of 0.010 inch radially in the location of the average pressure on the seal face, the change in the force tending to lift a 2½ inch diameter seal is 0.06 times the pressure sealed or 4.8 pounds for an 80 p.s.i. seal. The seal would continue to operate with a 6 pound initial load but would have blown off and failed in 1/10 the time had a one pound initial load been used.

An analysis of a gas seal of the face contact type quickly reveals an inherent problem. The hydrodynamic forces that must be generated by the gas seals are the same as the forces for a liquid seal, also the effect of a change in location of the pressure gradient is the same. However, the compressibility and low viscosity of the gas severely limits the hydrodynamic force the seal can develop. Also, gas will leak along the boundary approximately 1,000 times faster than the liquid. With a gas there is no longer large hydrodynamic forces and it is necessary to wisely use the forces that are present. Therefore, this invention provides a seal that changes in fluid pressure forces are balanced, and the hydrodynamic forces are only required to generate the forces necessary to accelerate the face seal to follow the seal plate. This seal is designed to operate over long periods of time at low axial forces so that seal friction is limited, and if wear or pressure changes change the axial forces on the seal the decrease or increase in friction will cause the effective axial forces to change to reestablish the original operating conditions.

Referring to FIG. 1, the reference numeral 1 denotes a receptacle or container having a tubular housing 2 extending therefrom containing a fluid under some pressure and the reference numeral 3 indicates a rotary shaft extending through the tubular housing 2 into the receptacle or container 1.

The shaft 3 carries an annular flange or disc 4 having a flat fluid seal face 5 disposed in fluid sealing relation with a stationary, axially movable complementary annular seal disc or face seal 6, the adjacent surfaces 7 and 5 of the respective stationary and rotary members comprising a face type seal for fluids contained in the receptacle 1 (preferably gaseous fluid) and the shaft 3 being a high speed shaft.

The outer end of the tubular housing 2 is outwardly flanged at 8 while the face seal 6 is secured in sealed relation to an annular housing or cylindrical casing 9 surrounding the periphery of the flange 8 and having an outer face or end 10 formed with an opening 11 surrounding the tubular housing or sleeve 2 in spaced relation.

Within the housing 9 are two thin metal bellows members 12 and 13 of smaller and larger diameters, respectively. The smaller bellows 12 being sealed at its opposite ends respectively to the inner edge of the opening 11 in the end 10 of the casing 9 and to one face or side of the flange 8 providing a relative high pressure area within the housing 9, indicated at 14, the bellows 12 being substantially uniform in diameter.

The other or larger bellows 13 is sealed at its opposite ends respectively to the outer edge or periphery of the flange 8 and to, or substantially to, the inner edge of the annular or washer shaped face seal 6 providing an annular relatively lower pressure area indicated at 15 in the opposite direction from the higher pressure area 14.

A filler plug 17 is preferably provided in the body 9 and a suitable secondary fluid, preferably a liquid having a predetermined vapor pressure is introduced into the casing in the chamber formed by the two bellows 12 and 13 and the shell of the casing 9.

The two bellows have resiliency and the resiliency of the bellows 13 forces the stationary flat or face seal member 6 against the rotating plate 4 to prevent leakage between the surfaces 5 and 7 of the seal members 4 and 6.

The frictional heat of the sliding surfaces 5 and 7 raises the temperature of the secondary fluid 18 and the increase in pressure in the secondary fluid container 9 reduces the force on the seal, due to the difference in bellows sizes and differential pressure areas 14 and 15. A stable point will be reached where the heat loss from the seal (due to the reduced friction between faces of the seal) equals the frictional input heat produced by the friction between the surfaces during the operation of the device. Of course, this can be varied to suit conditions by changing the relative differential areas and by changing the type of secondary fluid to change the ratio to increase (or decrease) the vapor pressure relative to the increase (or decrease) in temperature effective on the secondary fluid due to variations in friction between the contacting surfaces 5 and 7 of the seal.

Starting with a predetermined pressure of the seal face 7 on the face 5 of the disc or rotating plate 4 as effected by the resiliency (expansion) of the bellows 13 over the bellows 12, sufficient to prevent leakage of the primary fluid, indicated at 19, as the friction between the stationary face 6 and the rotary seating flange heats the parts to raise the temperature in the secondary fluid 18 causing expansion thereof the differential pressure areas 14 and 15 will move the casing 9 to lighten the friction between the seal, and reduction of the friction, of course, at some point prevents further rise in temperature in the secondary liquid and the dynamic or closing pressure of the seal faces is arrested at that point. This is very important where the primary fluid is gaseous.

The secondary fluid may also be gaseous, or a liquid partly filling the interior of the casing having the desired vapor pressure, also the sealing ring 6 may be made of low friction material, for instance carbon, if desired.

In this manner the sealing pressure may be held very low, reducing wear, and as wear takes place the device will automatically compensate for wear while maintaining the sealing pressure substantially uniform and low.

Figure 2:
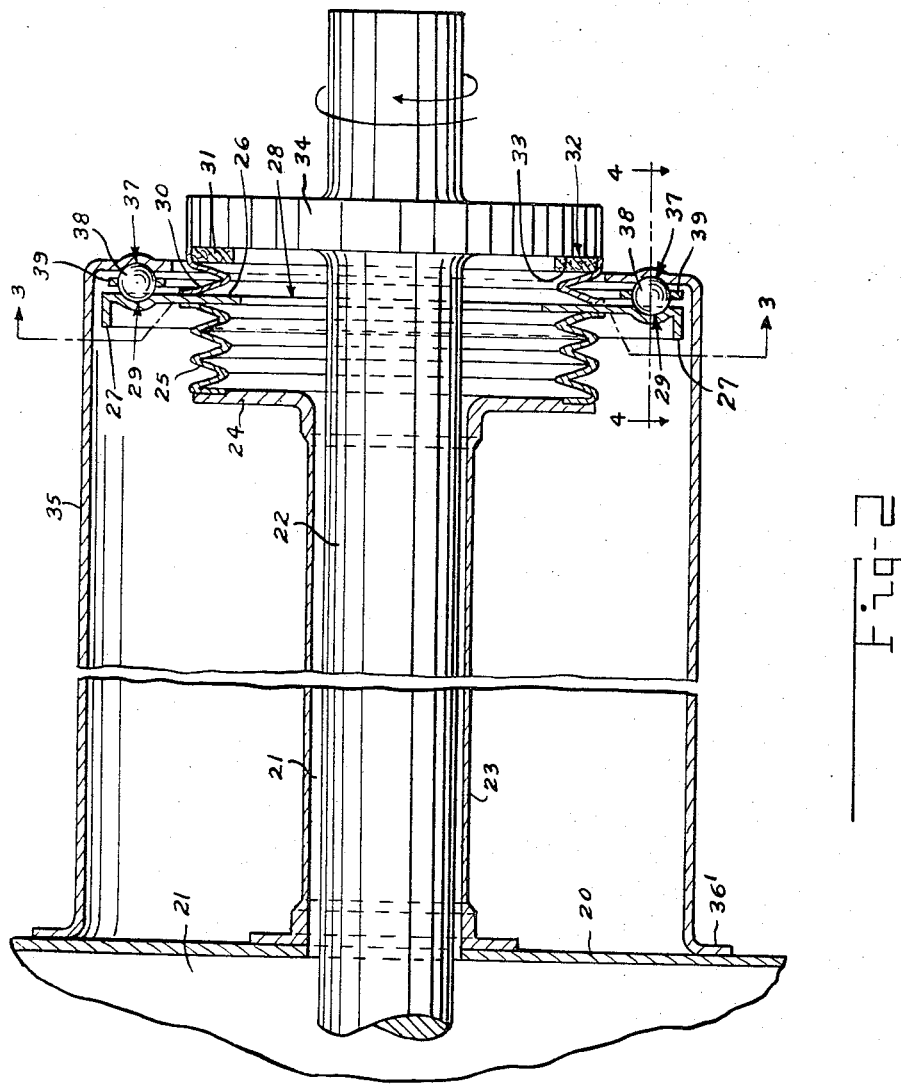
FIG. 2 is a similar longitudinal, vertical sectional view through a friction face seal between a fluid container or reservoir and a shaft, incorporating a different form of the invention for controlling the fluid sealing pressure between the face seal and the shaft in predetermined ratio to the degree of friction between the shaft and the seal during the rotation of the shaft.
Figure 3:
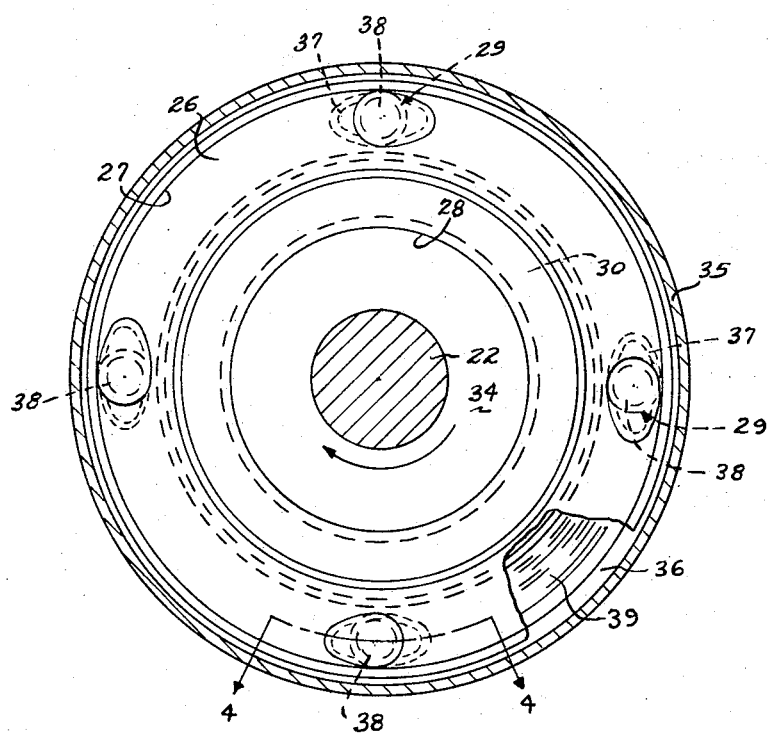
FIG. 3 is an enlarged sectional view taken about on the planes indicated by line 3—3 in FIG. 2, looking in the direction of the arrows, parts being broken away to show camming ball carrier plate.
Figure 4:
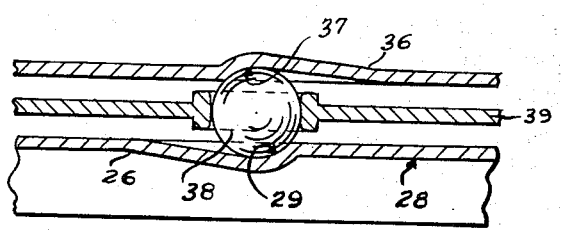
FIG. 4 is a further enlarged sectional view taken about on line 4—4 of FIG. 3, looking in the direction of the arrows.

Referring more particularly to FIG. 2 a full mechanical means is provided to control the dynamic seal pressure, in which a container 20 is provided containing a primary fluid 21, through which a rotary shaft 22 extends.

Surrounding the shaft 22 and extending outwardly from the container 20 in sealed relation is an elongated thin resilient torque tube or sleeve 23 preferably having considerable length.

The outer end of this thin cylindrical resilient torque tube 23 is outwardly flanged as indicated at 24 and a thin, resilient, preferably metal bellows 25 extends outwardly in concentric relation to the shaft 22, in sealed relation to the outer edge of the flange plate 24. The bellows 25 is preferably cylindrical in area, the opposite end of this bellows being secured in sealed relation to an annular torque plate 26 also concentrically surrounding the shaft 22 in spaced relation. The torque plate 26 extends radially outward a considerable distance beyond the bellows 25 with its outer edge or periphery formed with an angular stiffening flange 27. The face 28 of the torque disc 26 is perpendicular to the axis of the shaft 22 and is provided with a plurality of arcuate camming depressions 29 formed therein (four being shown although the number may be increased or decrease, if desired). The camming depressions 29 incline in the opposite direction to the direction of rotation of the shaft 22, from the deepest to the shallowest, on a circle concentric to the shaft 22 as shown.

This torque or camming plate 26 is preferably stiff, and a shorter resilient bellows 30 of the same diameter as bellows 25 has one end sealed to the opposite side of the disc 26 with its opposite end sealed to the annular face seal ring 31 (similar to the ring 6 in FIG. 1). This ring 31 has a face seal surface 32 which contacts the surface 33 of the annular disc like flange 34 on the shaft 22.

Surrounding the shaft 22 and bellows 25 and 30 is a rigid cylindrical shell or casing 35 having an inner flange 36' secured to the casing or container 20, as shown, the other or opposite end of this shell 35 being inwardly flanged as indicated at 36 in a plane parallel to the torque plate 26 (and perpendicular to the axis of the shaft 22).

The shell 35 and end flange are stiff and rigid, the end flange 36 having ball receiving camming depressions or recesses 37 which are complementary to the recesses 29 except they incline in the opposite direction relative to the camming recesses 29 but around the same radius (from the axis of the shaft 22), and when the shaft is at rest the deepest parts of the ball receiving depressions or recesses 29 and 37 are opposite each other.

Seated in each of the depressions is a camming ball member 38, these ball members being carried in a suitable carrier plate 39 for maintaining the balls 38 in their desired spaced relation to each other between the depressions 29 and 37.

As before mentioned, the resilient bellows 25 maintains axial pressure on the camming plate 26, the bellows 30 also preventing any relative rotative movement between the flange 24 of the torque tube 23 and the camming plate 26, while the bellows portion 25 maintains a predetermined sealing pressure on the annular face seal 31 from the camming disc 26. This pressure is light but sufficient to prevent leakage of the fluid from within the bellows and casing 20 when the shaft is at rest, and during rotation.

The torque tube 23 is thin, resilient, and fairly long, so that during the operation of the device the frictional contact between the surfaces 33 and 32 of the respective disc-like flange 34 and the face seal ring 31 tends to rotate or twist the torque tube between its ends. The thickness, diameter and resiliency of the torque tube determining the amount of twist communicated to the camming plate 26 relative to the degree of friction between the face seal ring 31 and the rotating sealing flange 34.

The drag of the rotating flange 34 on the face seal ring 31, through the shorter bellows portion 30 rotatively moves the camming plate 26 in the direction of shaft rotation, yieldably resisted by the torque tube, causes the inclined camming surfaces of the depressions 29 and 37 to be displaced in opposite directions, thus through the balls 38 cam the plate 26 away from the flange 36, and through the shorter bellows portion 30 reduces the sealing pressure on the face seal ring 31 with a corresponding reduction in the friction. Thus, a predetermined balanced ratio between sealing pressure and friction between the relatively moving sealing means is always automatically obtained.

Within limits, as wear takes place during rotation of the device, the friction between the seal members tends to become less, however, the torque tube then rotates the camming disc to permit the balls 38 to move further into the camming depressions 29 and 37 and thus maintains the friction and sealing pressures substantially constant.

Expansion or contraction of the torque tube 23 or the casing 35 produces the same results whereby the sealing pressure is automatically maintained substantially uniform.

While depressions 29 and 37 are formed respectively in both plate 26 and casing end flange 36, it is obvious that the depressions could be employed in only one of these elements, for instance, in the camming plate 26 while the contacting surface of the end flange 36 would be flat, without effecting the operation or principle involved.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invention as defined in the following claims.

I claim:

1. In a fluid face seal structure, a rotary shaft, an annular face seal fixed on said shaft perpendicular to the axis thereof for rotation therewith, a complementary stationary ring seal concentrically surrounding said shaft, axially movable into frictional fluid sealing relation with said face seal to prevent fluid leakage therebetween, means yieldably urging said ring seal into frictional contact and fluid sealing engagement with said face seal producing heating due to said friction, and means responsive to predetermined heating between said face and ring seals for reducing the degree of sealing pressure therebetween in predetermined ratio to the degree of said friction heating therebetween.

2. In a rotary fluid sealing structure, a casing, a rotary shaft extending out of said casing, a circular face seal concentrically fixed on said shaft in a plane perpendicular to the axis of said shaft, an annular complemental ring seal concentrically surrounding said shaft in contacting frictional fluid sealing engagement with the surface of said face seal to prevent fluid leakage therebetween and producing frictional heat, a resilient bellows surrounding said shaft under compression, having one end sealed to said casing and its opposite end sealed to said complemental ring seal yieldably urging said ring seal into frictional fluid sealing contact with said face seal producing frictional heat during rotation of said shaft, and means confined within said bellows responsive to the degree of frictional heating engagement between said face and ring seals for reducing the degree of pressure of said bellows on said ring seal to relieve the degree of sealing and frictional engagement with said face seal, in predeterminted ratio to the degree of frictional heating between said seals during rotation of said shaft.

3. A fluid sealing device for a rotary shaft comprising, a housing through which the shaft extends, an axially expandable and contractible temperature responsive element mounted within said housing, a rotary fluid sealing disc fixed on said shaft, a complementary rotary fluid sealing ring fixed to said temperature responsive element in frictional fluid sealing contact with said disc for conducting temperature changes caused by friction between said ring and said disc to said temperature responsive element, said temperature responsive element comprising a differential pressure responsive bellows member between said housing and ring expandable to reduce friction between said disc and said ring, and an expandable pressure fluid contained therein having a variable vapor pressure responsive to temperature changes for expanding said bellows to reduce the contact pressure between said ring and disc in predetermined ratio to temperature rise in said fluid due to heat transfer by frictional contact between said sealing ring and said disc.

4. A sealing device for preventing leakage of a fluid into or out of a housing through which a rotating shaft extends comprising a housing, a shaft extending out of said housing, an elongated resilient twistable torque tube surrounding said shaft in spaced concentric relation having an inner end fixed in sealed relation to said housing, said torque tube having a concentric annular outwardly flanged outer end, a concentric circular disc fixed on said shaft having a fluid sealing friction surface disposed in axially spaced outward relation to said flanged outer end in a plane perpendicular to the axis of said shaft, a fluid sealing ring concentrically surrounding said shaft for fluid sealing frictional contact with the peripheral portion of said friction surface of said disc, a stiff annular camming plate member concentrically surrounding said shaft intermediate said outwardly flanged twistable torque tube end and said annular disc, a cyclindrical concentric extensible resilient bellows member surrounding said shaft having one end fixed in sealed relation to said torque tube flanged outer end and its opposite end fixed in sealed relation to the camming plate for yieldably urging said camming plate toward said circular disc, a second concentric resilient bellows member surrounding said shaft in fixed sealed relation at one end to said camming plate and fixed in sealed relation at its other end to said fluid sealing ring for urging said sealing ring into sealing contact with said disc, an outer shell fixed to said housing in concentric surrounding relation to said twistable torque tube and bellows members having an inwardly flanged camming outer end parallel to said camming plate, in a plane intermediate said camming plate and said fluid sealing ring, and camming means between said camming plate and said inwardly flanged camming outer end of said outer shell for camming said camming plate in a direction away from said camming end of said outer shell in predetermined ratio to rotative displacement of said camming plate by twisting displacement of said torque tube by predetermined friction between said sealing ring and said circular disc on said shaft during rotation of said shaft, whereby torque communicated through said bellows twists said torque tube to cause rotative displacement of said camming plate relative to said flanged camming end of said outer shell to actuate said camming means to reduce the sealing pressure of said sealing ring on said friction surface of said disc in predetermined ratio to twist of said torque tube by the degree of frictional drag between said friction disc and said ring during rotation of said shaft.

5. In a rotary fluid face seal structure, a fluid receptacle adapted to contain a fluid, a rotary shaft extending out of said receptacle having an annular flange projecting radially outward therefrom having a fluid sealing friction surface facing said receptacle in materially spaced relation perpendicular to the axis of said rotary shaft, a circular fluid sealing friction ring disposed in concentric fluid sealing frictional contacting engagement with said fluid sealing surface, resilient bellows means concentrically surrounding said shaft under predetermined compression having an outer end secured in fluid sealed relation to said friction sealing ring, a thin cylindrical twistable torque tube concentrically surrounding said shaft in spaced relation having an outer end fixed in fluid sealing relation to the other end of said bellows and its other end fixed to said receptacle in fluid tight relation, whereby said bellows urges said friction sealing ring into sealing frictional contact with said fluid sealing friction surface of said shaft, to twist and torque said torque tube in the direction of rotation of said shaft, and camming means between said bellows and said receptacle, responsive to rotative torque on said bellows, by said torque tube to reduce frictional contacting pressure between said sealing ring and said fluid sealing surface in predetermined ratio to the rotative displacement between said friction sealing ring and said receptacle caused by rotative displacement of said sealing friction sealing ring in the direction of rotation of said shaft.

6. In a rotary fluid sealing structure of the class described, a fluid container, a rotary shaft extending out of said container, a circular fluid sealing disc concentrically fixed on said shaft having a flat fluid sealing friction face perpendicular to said shaft facing said container, a resilient two part bellows member concentrically surrounding said shaft under compression comprising a smaller diameter and area bellows portion at its inner end nearest to said container and a larger diameter and area bellows portion at its outer end, a circular fluid sealing friction ring fixed to the outer larger diameter and area end of said bellows member, said container having a tubular extension surrounding said shaft formed with an outwardly flanged end, sealed to the inner surface of said bellows member intermediate said smaller and larger diameter and area bellows portions, a cylindrical shell surrounding said bellows member in spaced relation having an outer end secured in fluid sealed relation to said fluid sealing friction ring and its opposite end flanged inwardly and secured in fluid sealed relation to said inner end of said smaller diameter and area bellows portion, to provide a closed fluid pressure chamber surrounding said bellows member, a temperature responsive expansion and contraction fluid in said fluid pressure chamber in heat exchange relation with said sealing ring responsive to variations in temperature changes in said sealing ring due to variations in heat caused by frictional contact of said sealing ring on said contact face of said disc for expanding said bellows member to reduce the contacting pressure of said bellows members on said sealing ring in predetermined ratio to the increases in temperature of the pressure responsive fluid in said fluid pressure chamber during rotation of said shaft.

7. In a fluid container sealing structure for a rotary shaft, a fluid containing casing, a rotary shaft extending out of said casing, an annular flat friction face fluid sealing disc fixed on said shaft perpendicular thereto and facing said casing in spaced relation, a complemental fluid sealing friction ring concentrically surrounding said shaft between said disc and said casing in yieldable fluid tight fixed relation to said container, and movable axially for variable contacting frictional engagement with said disc during rotation thereof by said shaft, friction responsive contact pressure relief means connected between said casing and said ring yieldably urging said ring into fluid sealing frictional engagement with said disc, including means responsive to friction sealing contact between said ring and said disc to vary the contacting engagement of said ring on said disc by moving said ring toward said disc in response to a decrease in the degree of friction between said ring and said disc during the rotation thereof by said shaft.

References Cited
UNITED STATES PATENTS

| | | | |
|---|---|---|---|
| 1,763,574 | 6/1930 | Williams | 277—88 |
| 1,876,520 | 9/1932 | Newkirk et al. | 277—88 |
| 2,192,426 | 3/1940 | Ames | 277—88 |
| 2,969,132 | 1/1961 | Stewart | 192—56 |
| 2,969,133 | 1/1961 | Langheck | 192—56 |
| 3,080,029 | 3/1963 | Stober | 192—56 |
| 3,095,955 | 7/1963 | Orwin | 192—56 |

LAVERNE D. GEIGER, *Primary Examiner.*

D. MASSENBERG, *Assistant Examiner.*